United States Patent [19]

Ricks

[11] Patent Number: 5,620,201
[45] Date of Patent: Apr. 15, 1997

[54] REMOVABLE, SNAP-IN MOUNTING SYSTEM FOR AIRBAG MODULE

[75] Inventor: Merle K. Ricks, Layton, Utah

[73] Assignee: Morton International, Inc., Chicago, Ill.

[21] Appl. No.: 603,608

[22] Filed: Feb. 21, 1996

[51] Int. Cl.$^6$ ............................................. B60R 21/20
[52] U.S. Cl. ..................... 280/728.2; 280/731; 280/732
[58] Field of Search ........................... 280/728.2, 731.732

[56] References Cited

U.S. PATENT DOCUMENTS

| | | | |
|---|---|---|---|
| 5,135,252 | 8/1992 | Suran et al. | 280/732 |
| 5,207,544 | 5/1993 | Yamamoto et al. | 280/728.2 |
| 5,333,897 | 8/1994 | Landis et al. | 280/728.2 |
| 5,350,190 | 9/1994 | Szigethy | 280/728.2 |
| 5,380,037 | 1/1995 | Worrell et al. | 280/728.2 |
| 5,489,116 | 2/1996 | Boag | 280/728.2 |

*Primary Examiner*—Kenneth R. Rice
*Attorney, Agent, or Firm*—George W. Rauchfuss, Jr.; Gerald K. White

[57] ABSTRACT

A removable, snap-in airbag module mounting system for mounting an airbag module within a mounting recess of a motor vehicle. The system comprises a module housing of the airbag module and a hub plate in the mounting recess for supporting the module housing. A first mounting latch mechanism is secured to the module housing and has a biased, retractable latch that retracts to slide along a first upright of the hub plate and bias outwardly again to engage a first slot defined by the first upright. A second mounting latch mechanism is also secured to the module housing and has a biased, retractable latch that retracts to slide along a second upright of the hub plate and bias outwardly again to engage a second slot defined by the second upright. The engagements between the biased, retractable latches and the slots, in combination, secure the module housing within the mounting recess. According to another embodiment of the present invention, a mounting hook for engaging the second slot is secured to the module housing in place of the second mounting latch mechanism. According to an additional embodiment of the present invention, the first and second mounting latch mechanisms are secured to the hub plate and the first and second slots are defined by the module housing.

25 Claims, 9 Drawing Sheets

REMOVABLE, SNAP-IN MOUNTING SYSTEM FOR AIRBAG MODULE

FIELD OF THE INVENTION

The present invention relates to an airbag module mounting system and, more particularly, to a removable, snap-in mounting system for mounting an airbag module.

BACKGROUND OF THE INVENTION

A driver side airbag module for a motor vehicle is normally mounted within the hub of a steering wheel of the motor vehicle and is usually modular in design to speed installation within the motor vehicle. Many existing airbag modules are mounted to the steering wheel using bolts. Bolting the airbag module to the steering wheel, however, is a time consuming mounting method that does not allow for easy removal of the airbag module. Preferably the airbag module should be mounted so that it can be easily removed for servicing or replacement or to gain access to other components normally contained within the steering wheel, such as a horn switch for example. The airbag module should also be securely mounted to the steering wheel so that the airbag module will remain attached during deployment of an airbag cushion from the airbag module.

Accordingly there is a need for an airbag module mounting system that allows quick and easy mounting of the airbag module, that securely mounts the airbag module to the steering wheel and that provides for easy removal of the mounted airbag module from the steering wheel.

SUMMARY OF THE INVENTION

An object, therefore, of the present invention is to provide a mounting system for an airbag module that is quick and easy to install and securely mounts the airbag module within a motor vehicle and yet permits easy removal of the airbag module. In carrying out this invention, there is provided an airbag module mounting system for mounting an airbag module within a mounting recess of a motor vehicle. The system comprises a module housing of the airbag module and mounting structure within the mounting recess for supporting the module housing. A first slot is defined by one of the module housing or the mounting structure and a first mounting latch mechanism is secured to the other of the module housing or the mounting structure and has a biased, retractable latch extending outwardly therefrom. The biased retractable latch is for retractably allowing passage of the module housing or retractably sliding along the mounting structure and then biasing outwardly again to engage the first slot. A second slot is defined by one of the module housing or the mounting structure and a mounting projection is secured to the other of the module housing or the mounting structure for engaging the second slot, whereby the engagement between the biased latch and the first slot and the engagement between the mounting projection and the second slot, in combination, will secure the module housing within the mounting recess.

According to another aspect of the present invention, an airbag module for mounting to mounting structure within a mounting recess of a motor vehicle is provided. The airbag module comprises an airbag cushion, airbag cushion inflating means and a module housing supporting the airbag cushion and airbag cushion inflating means. Either of a first slot is defined by the module housing for receiving a retractable latch of a first mounting latch mechanism secured to the mounting structure, or a first mounting latch mechanism is secured to the module housing and has a biased, retractable latch extending outwardly therefrom for retractably sliding along the mounting structure and then biasing outwardly again to engage a first slot defined by the mounting structure. Either of a second slot is defined by the module housing for receiving a mounting projection on the mounting structure, or a mounting projection is secured to the module housing for engaging a second slot defined by the mounting structure. An engagement between the biased latch and the first slot and an engagement between the mounting projection and the second slot, in combination, will secure the module housing of the airbag module within the mounting recess.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
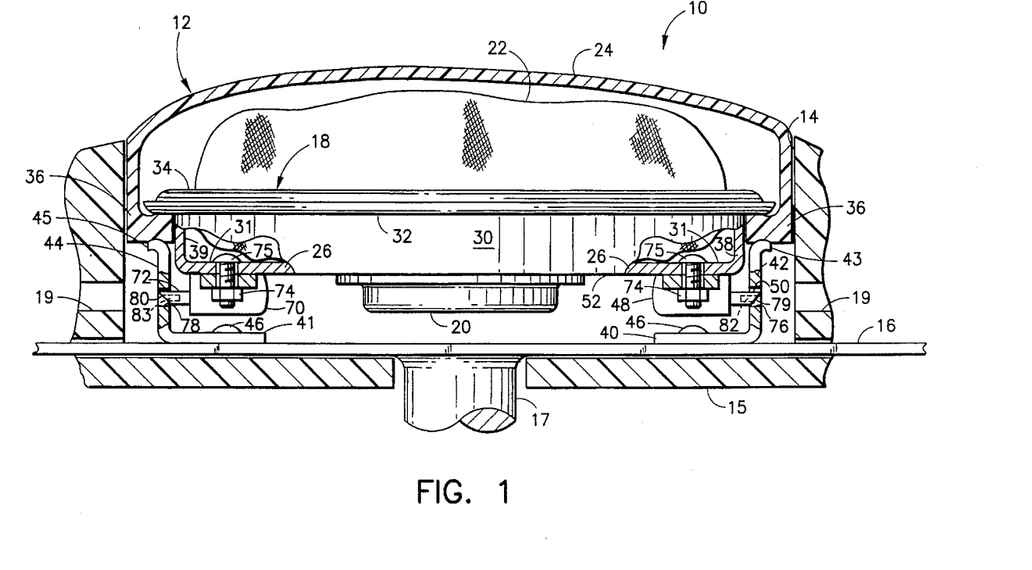
FIG. 1 is a plan view, partially in section, of a mounting system according to the present invention for an airbag module.
Figure 2:
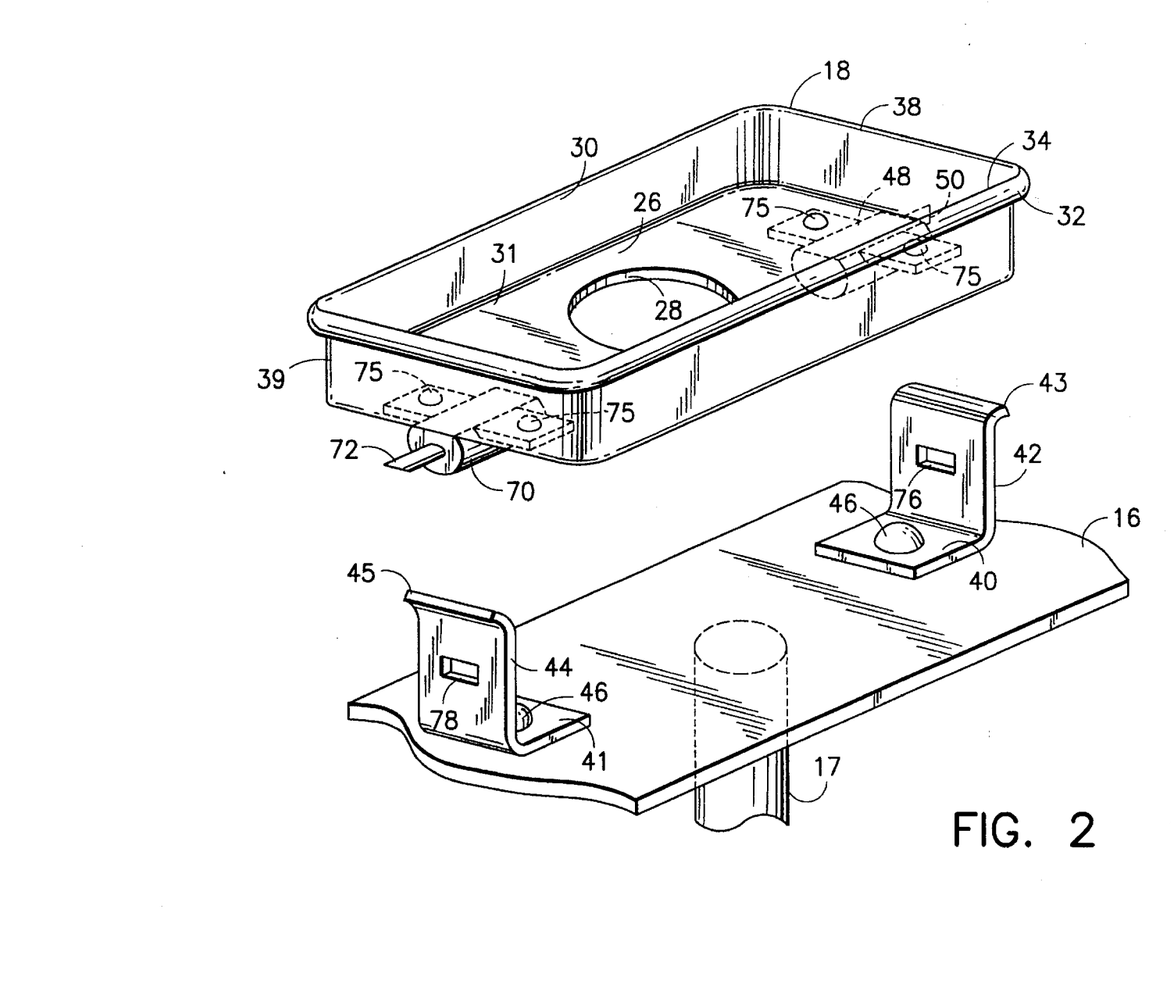
FIG. 2 is a partial, exploded, perspective view of a module housing and a hub plate of the mounting system of FIG. 1.
Figure 3:
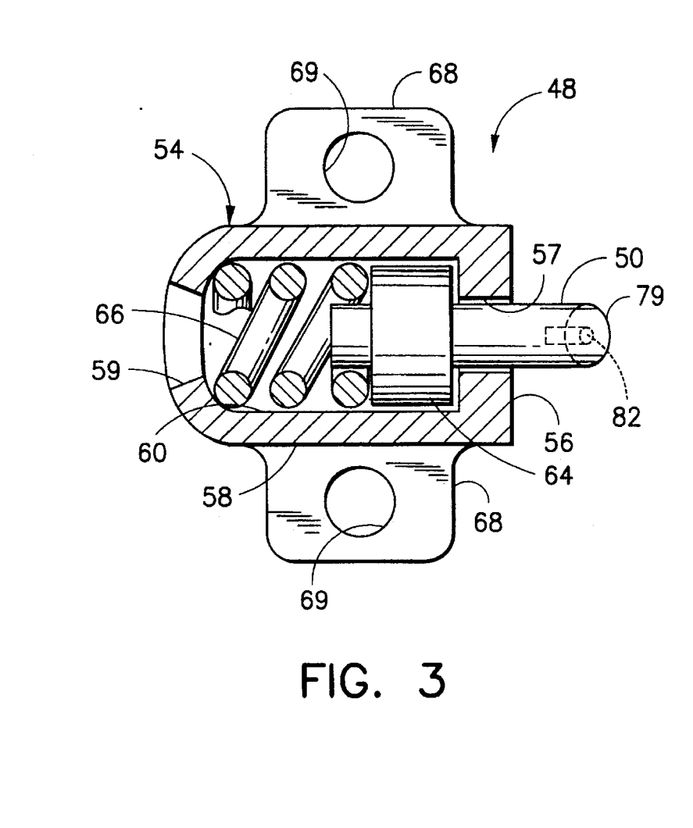
FIG. 3 is a bottom view, partially in section, of a mounting latch mechanism of the mounting system of FIGS. 1 and 2.

Referring first to FIGS. 1 through 3, the present invention is directed to a removable, snap-in airbag module mounting system 10 for mounting an airbag module 12 within a mounting recess 14 of motor vehicle. As shown and described, the airbag module 12 is a driver side airbag module mounted within the mounting recess 14 defined by a steering wheel cover 15 molded to a hub plate 16 of a steering wheel of a motor vehicle. As shown, the hub plate 16 can be secured to a steering column 17. The mounting system 10, however, could also be used with other types of airbag modules such as a passenger side airbag module mounted within a dashboard or a side-impact airbag module mounted on a seat, for example, but is especially suitable for a driver side airbag module mounting system.

The airbag module 12 includes a module housing 18, an airbag cushion 22, airbag cushion inflating means comprising an inflator 20 and an airbag module cover 24. How the airbag module 12 functions, however, is known in the art and, therefore, not described here in detail. Only how the airbag module 12 is mounted and the components related to mounting are described in detail. The module housing 18 includes a module base plate 26 defining an opening 28 accommodating the inflator 20. A housing sidewall 30 extends upwardly from an outer edge 31 of the module base plate 26 to a curled lip 32 defining an open top 34 of the module housing 18. The housing sidewall 30 includes a first endwall 38 and a second endwall 39, and the base plate 26 and housing sidewall 30 are generally rectangular, but other shapes are suitable. The housing sidewall 30 is adapted to house the uninflated, stored airbag cushion 22, which is folded within the module housing 18 prior to inflation. The curled lip 32 of the housing sidewall 30 is adapted to catch a molded base 36 of the airbag module cover 24 to close the open top 34 of the module housing 18 and enclose the airbag cushion 22 and the inflator 20.

The mounting recess 14 is sized and adapted to receive the airbag module 12 which is installed within the mounting recess by being dropped or pushed straight into the recess. Mounting structure for supporting the airbag module 12 comprises the hub plate 16 and opposing first and second upright members 42,44 secured to and extending upwardly from, and generally transversely to, the hub plate. Each upright member 42,44 has a top edge 43,45 and a base 40,41 which is secured to the hub plate 16 with suitable means such as bolts 46, for example, or by welding or the like. The upright members 42,44 could also be formed unitary with the hub plate 16.

A first mounting latch mechanism 48 having a biased, retractable latch 50 extending radially outwardly therefrom is secured to a bottom surface 52 of the housing baseplate 26 of the module housing 18 so that the biased latch extends beyond and transversely to the housing sidewall 30 and transversely to the first upright member 42. As shown in FIG. 3, the biased latch mechanism 48 includes a generally cylindrical case 54 having an endwall 56 and a sidewall 58 extending from the endwall and terminating in a partially open end 59 of the sidewall. The sidewall 58 and endwall 56 form a generally cylindrical cavity 60 and the endwall defines a port 57 communicating with the cavity. A generally cylindrical guide 64, that is larger than the port 57, is slidingly received within the cavity 60 of the case 54, and the latch 50, which is also cylindrical, extends from the guide 64 and slidingly extends through the port 57. Biasing means comprising a spring 66 is contained within the cavity 60 by the partially open end 59 of the sidewall 58 and biases the guide 64 towards the port 57. The spring 66 and the sliding relationship between the guide 64 and case 54 make the latch 50 retractable. Mounting tabs 68 extend from the case 54 and define apertures 69 for mounting the mounting latch mechanism 48.

Referring again to FIGS. 1 and 2, a mounting projection comprising a second mounting latch mechanism 70, identical to the first mounting latch mechanism 48, is also secured to the bottom surface 52 of the base plate 26 of the module housing 18 and has a biased, retractable latch 72 extending beyond and transversely to the housing sidewall 30 and transversely to the second upright member 44. The first and second mounting latch mechanisms 48,70 are secured to the bottom surface 52 of the baseplate 26 by suitable means such as nuts 74 and bolts 75, for example, or by welding or the like.

Upon installation of the airbag module 12 within the mounting recess 14, the biased, retractable latches 50,72 of the first and second mounting latch mechanisms 48,70 retract and slide along or down the first and second upright members 42,44 of the hub plate 16 and then are biased outwardly again to engage a first opening comprising a first slot 76 defined by the first upright member and a second opening comprising a second slot 78 defined by the second upright member. The engagement between the first biased latch 50 and the first slot 76 and the engagement between the second biased latch 72 and the second slot 78, in combination, secures the module housing 18 within the mounting recess 14. In effect, the mounting system 10 allows the airbag module 12 to be easily snapped into the mounting recess 14 simply by pushing or dropping the module into the mounting recess and thereby securing the airbag module in a manner such that it is able to withstand the forces created by a deployment of the airbag cushion Each of the biased, retractable latches 50,72 has a tip 79,80 that can slope inwardly and face downwardly towards the mounting recess 14, and the top edge 43,45 of each upright member 42,44 of the hub plate 16 can curve outward, away from the module housing 18 to allow the latches to be easily pushed in or retracted upon the sloped tips of the latches contacting the outwardly curved top edges of the upright members. The mounting system 10 according to the present invention allows for quick and easy installation of an airbag module 12. In addition, as shown in FIG. 3, the latches 50,70 can have recesses 82,83 at their tips 79,80 for receiving the end of a screw driver or other similar tool, for pushing the latches in, so that the airbag module 12 is simply removed by inserting a screw driver through access holes 19 defined by the steering wheel cover 15 to push in the latches 50,72 and disengage the latches from the slots 76,78. The mounting system 10 of the present invention, therefore, also provides for quick and easy removal of the airbag module 12 for repair or replacement of the airbag module or for gaining access to other components located under the steering wheel cover 15.

Module biasing means that biases the module housing 18 away from the hub plate 16 comprises the molded base 36 of the airbag module cover 24. As shown in FIG. 1, the molded base 36 of the module cover 24, which is made of a suitable resilient material such as polyurethane for example, is sandwiched between the curled lip 32 of the module housing 18 and the top edges 43,45 of the upright members 42,44 of the hub plate 16, biasing the module housing 18 away from the hub plate 16. Upon mounting the airbag module 12 in the mounting recess 14, the molded base 36 is compressed against the upright members 42,44 allowing over travel of the biased, retractable latches 50,72 so that the latches can engage their respective slots 76,78. The resilient molded base 36 then biases the latches 50,72 against the top of the slots 76,78 to provide for rattle-free mounting. Module biasing means could alternatively comprise a spring or rubber pad positioned between the module housing 18 and the hub plate 16, for example.

Figure 4:
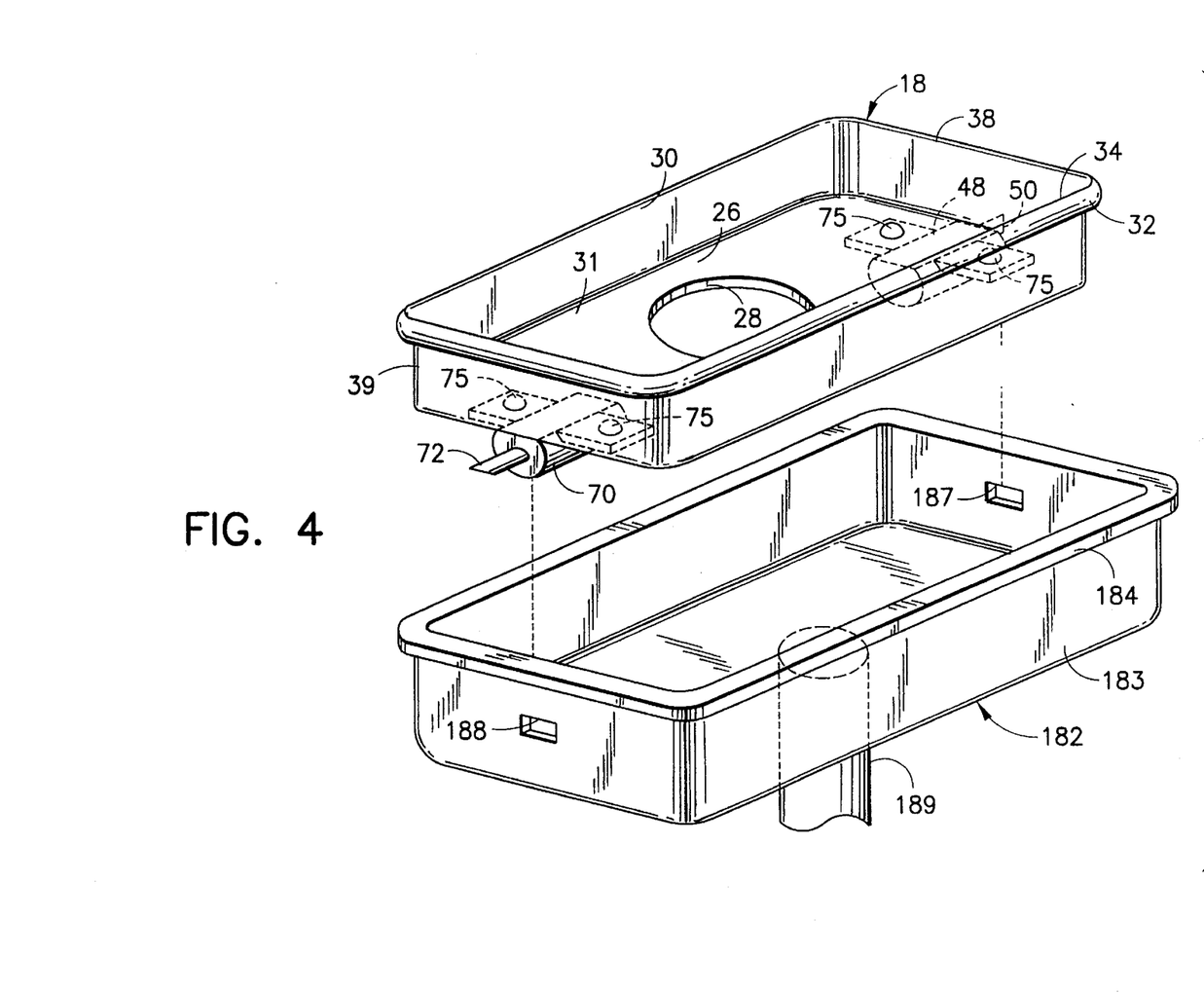
FIG. 4 is an exploded, perspective view of the module housing of the mounting system of FIG. 1 and another hub plate according to the present invention.

FIG. 4 shows another mounting structure 182 for supporting the airbag module 12 of FIGS. 1 and 2. The mounting structure comprises a hub plate 182 having a continuous hub sidewall 183 extending upwardly from the hub plate to a top edge 184. The hub plate 182 and hub sidewall 183 are generally rectangular and sized to receive the module housing 18. The hub sidewall 183 defines a first opening comprising a first slot for receiving the biased retractable latch 50 of the first mounting latch mechanism 48, and also defines a second opening comprising a second slot 188 for receiving the biased retractable latch 72 of the second mounting latch mechanism 70. As shown, the first slot 187 is positioned generally opposite the second slot 188. The top edge 184 of the hub sidewall 183 can curve or bend outwardly to more easily push in the retractable latches 50,72. As shown, the hub plate 182 can be secured to a steering column 189. Although not shown, it is anticipated that steering wheel spokes will extend from the hub plate 182 or hub sidewall 183 of FIG. 4, and the hub plate 16 of FIGS. 1 and 2, to a steering wheel rim.

FIGS. 5 through 10 show other airbag module mounting systems according to the present invention. Elements of the mounting systems of FIGS. 5 through 10 which are the same or perform the same or similar function as the elements of the mounting system 10 of FIGS. 1 through 3 have the same reference numeral.

Figure 5:
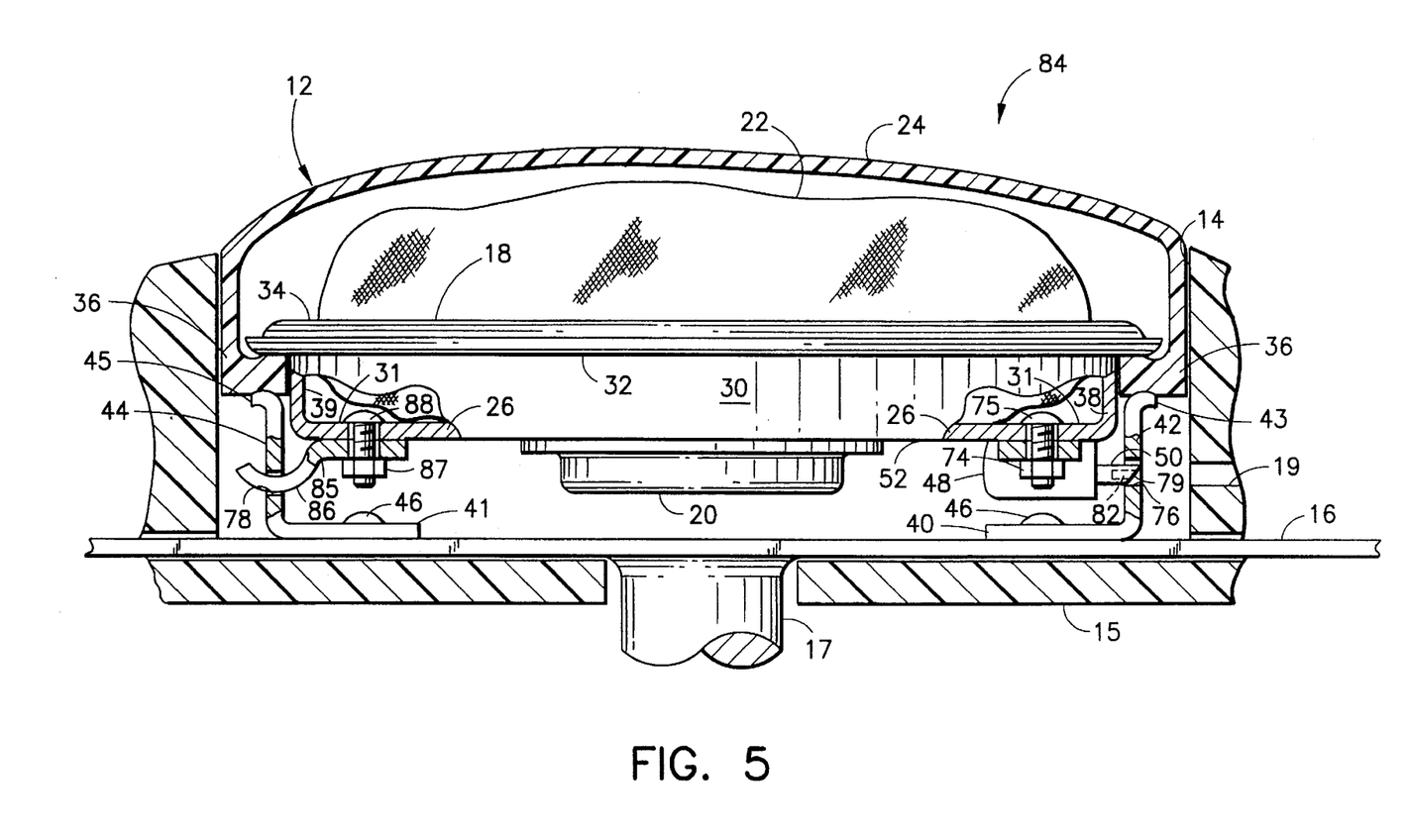
FIG. 5 is a plan view, partially in section, of another mounting system according to the present invention for an airbag module.

FIG. 5 shows an airbag module mounting system 84 according to the present invention that is similar to the mounting system 10 of FIGS. 1 through 3. In place of the second mounting latch mechanism 70, however, the mounting projection comprises a curved or bent mounting hook 86 for engaging the second slot 78 defined by the second upright member 44. A base 85 of the mounting hook 86 is secured to the bottom surface 52 of the baseplate 26 of the module housing 18 by suitable means such as a nut 87 and bolt 88, for example, or welding or the like. The airbag module 12 is mounted by first placing the second slot 78 over the mounting hook 86 and then pivoting the airbag module 12 into the hub plate 16 until the biased, retractable latch 50 of the first mounting latch mechanism 48 engages the first slot 76 of the first upright member 42.

Figure 6:
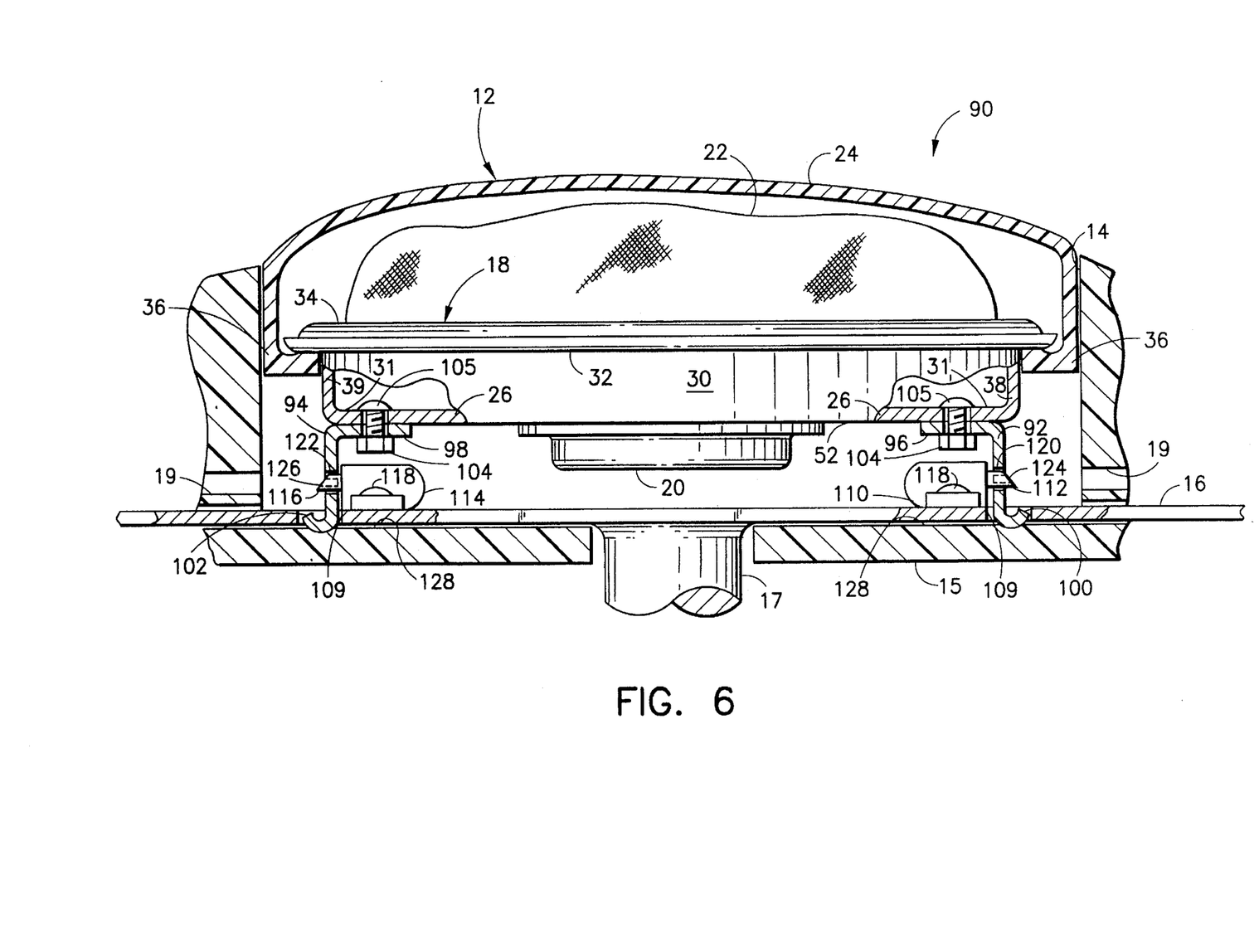
FIG. 6 is a plan view, partially in section, of an additional mounting system according to the present invention for an airbag module.

FIG. 6 shows another airbag module mounting system 90 according to the present invention. The module housing 18 of the airbag module 12 includes a first and a second vertical plate 92,94. Each vertical plate 92,94 extends downwardly from a base 96,98 secured to the bottom surface of the baseplate 26 of the module housing 18, and terminates in a bottom edge 100,102. The bases 96,98 are secured to the module housing 18 by suitable means such as nuts 104 and bolts 105, for example, or welding or the like.

A first mounting latch mechanism 110, similar to the mounting latch mechanism of FIGS. 1 through 3, having a biased, retractable latch 112 extending outwardly therefrom is secured to the hub plate 16 so that the biased latch extends outwardly and transversely to the first vertical plate 92. A mounting projection comprising a second mounting latch mechanism 114, identical to the first mounting latch mechanism 110, having a biased, retractable latch 116 extending outwardly therefrom is secured to the hub plate 16 so that the latch extends outwardly and transversely to the second vertical plate 94. The first and second mounting latch mechanisms 110,114 are secured to the hub plate 16 by suitable means such as bolts 118, for example, or by welding or the like.

Upon installation of the airbag module 12 within the mounting recess 14, the biased, retractable latches 112,116 of the first and second mounting latch mechanisms 110,114 retract and allow passage of the first and second vertical plates 92,94 of the module housing 18 and then are biased outwardly again to engage a first opening comprising a first slot 120 defined by the first vertical plate and a second opening comprising a second slot 122 defined by the second vertical plate. The engagement between the latch 112 of the first mounting latch mechanism 110 and the first slot 120, and the engagement between the latch 116 of the second mounting latch mechanism 114 and the second slot 122, in combination, secures the module housing 18 within the mounting recess 14.

Both of the biased, retractable latches 112,116 have a tip 124,126 that can slope inward and face upward towards the module housing, and the bottom edge 100,102 of each vertical plate 92,94 can curve outwardly to allow the latches to be more easily pushed in or retracted by the vertical plates upon pressing the airbag module 12 into the mounting recess 14. Module biasing means that biases the module housing 18 away from the hub plate 16 comprises a floor 128 of the mounting recess 14 which is made out of a suitable resilient material such as polyurethane, for example. The bottom edges of the vertical plates 92,94 extend through apertures 109 in the hub plate 16 to butt against the floor 128 and bias the module housing 18 away from the hub plate. Upon mounting the airbag module 12 in the mounting recess 14, the floor 128 is compressed under the vertical plates 92,94 allowing over travel of the biased, retractable latches 112, 116 so that the latches can engage their respective slots 120,122. The resilient floor 128 then biases the bottom of the slots 120,122 against the latches 112,116 to provide for rattle-free mounting. Module biasing means could alternatively comprise a spring or rubber pad positioned between the module housing 18 and the hub plate 16, for example.

Figure 7:
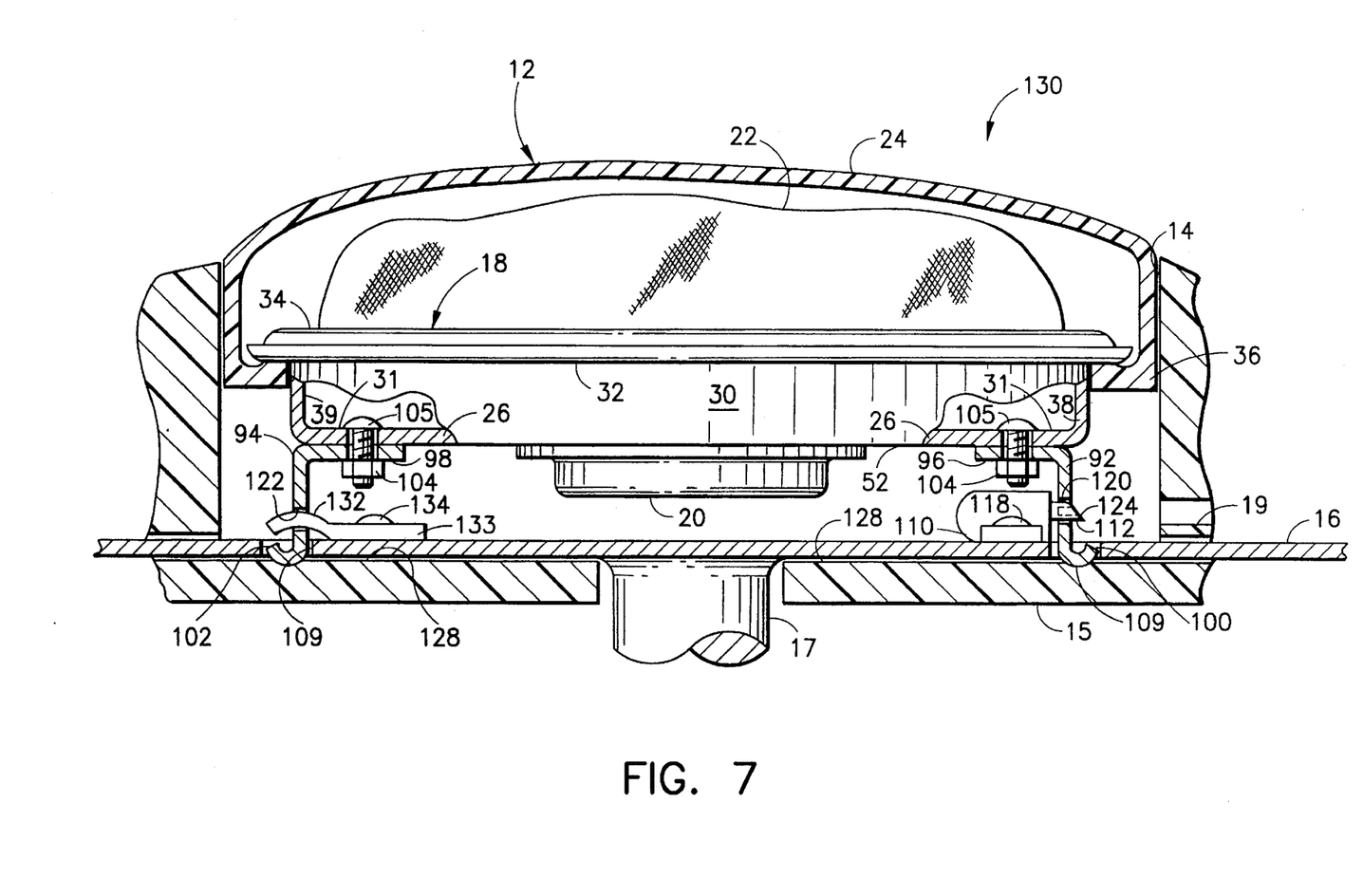
FIG. 7 is a plan view, partially in section, of a further mounting system according to the present invention for an airbag module.

FIG. 7 shows an additional airbag module mounting system 130 according to the present invention that is similar to the mounting system 90 of FIG. 6. Elements of the mounting system 130 of FIG. 7 which are the same or perform the same or similar function as the additional elements of the mounting system 90 of FIG. 6 have the same reference numeral. In place of the second mounting latch mechanism 114, however, the mounting projection comprises a curved or bent mounting hook 132 for engaging the second slot 122 defined by the second vertical plate 94. A base 133 of the mounting hook 132 is secured to the hub plate 16 by a suitable means such as a bolt 134, for example, or by welding or the like. The airbag module 12 is mounted by first placing the second slot 122 over the mounting hook 132, then pivoting the airbag module 12 into the mounting recess 14 until the biased, retractable latch 112 of the first mounting latch mechanism 110 engages the first slot 120 defined by the first vertical plate 92.

Figure 8:
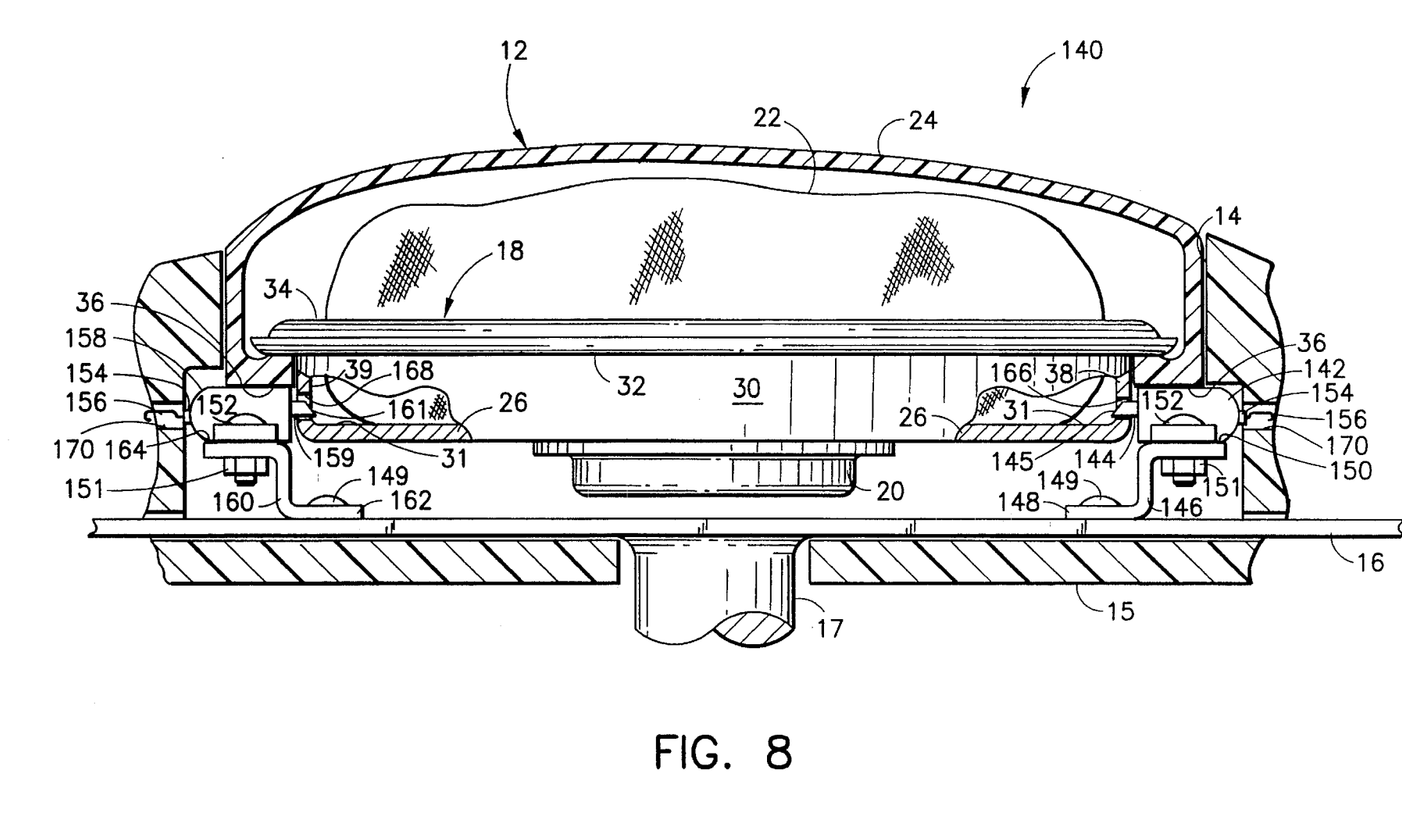
FIG. 8 is a plan view, partially in section, of still another mounting system according to the present invention for an airbag module.
Figure 9:
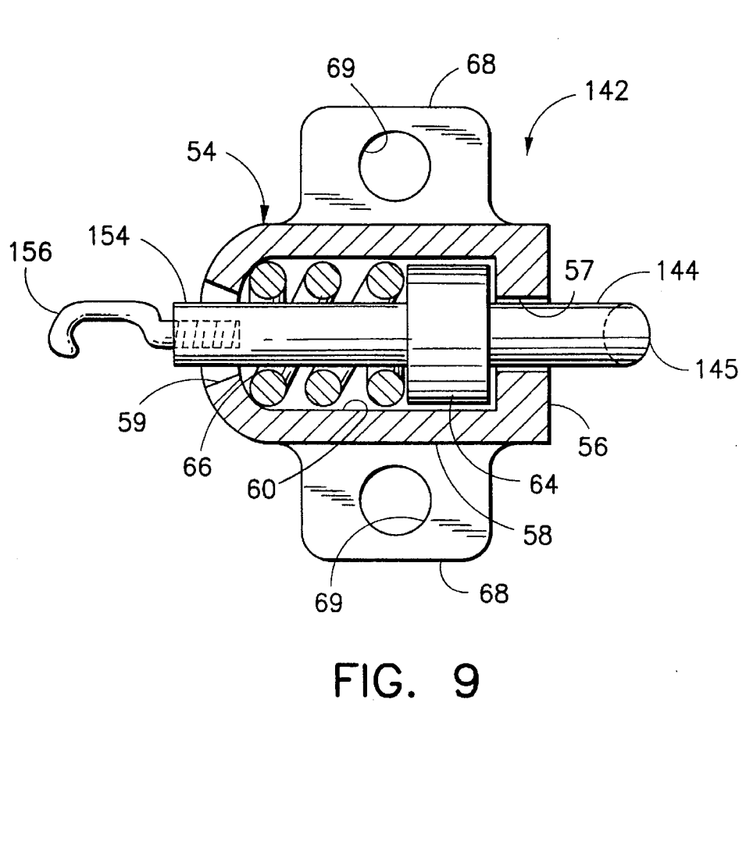
FIG. 9 is a bottom view, partially in section, of a mounting latch mechanism of the mounting system of FIG. 8.

FIG. 8 shows another airbag module mounting system 140 according to the present invention. A first mounting latch mechanism 142 having a biased, retractable latch 144 extending therefrom is secured to a first upright member 146 of the hub plate 16 so that the biased latch 144 extends inwardly towards the module housing 18 and transversely to the first endwall 38 of the module housing. The first upright member 146 has a base 148 that is secured to the hub plate 16 by suitable means such as a bolt 149, for example, or by welding or the like. The first upright member 146 bends outwardly to form a seat 150 for supporting the first mounting latch mechanism 142 which is secured to the seat by suitable means such as nuts 151 and bolts 152, for example, or by welding or the like. As also shown in FIG. 9, the first mounting latch mechanism 142 is similar to the mounting latch mechanism 48 of FIG. 3 and elements which are the same or perform the same or similar function have the same reference numeral. The mounting latch mechanism 142 of FIGS. 8 and 9 further includes a handle 154 for retracting the biased latch 144. The handle 154 extends from the guide 64, opposite the latch 144, through the spring 66 and through the partially open end 59 of the case sidewall 58. A hook 156 can be threadedly received by the handle 154 so that the latch 144 can be retracted or pulled back into the case 54 by pulling on the hook.

Referring again to FIG. 8, a mounting projection comprising a second mounting latch mechanism 158, identical to the first mounting latch mechanism 142 and having a biased, retractable latch 159 extending therefrom, is secured to a second upright member 160 of the hub plate 16 so that the biased, retractable latch extends inwardly towards the module housing 18 and transversely to the second endwall 39 of the module housing 30. The second upright member 160 also has a base 162 that is secured to the hub plate by a suitable means such as a bolt 149, for example, or by welding or the like. The second upright member 160 bends outwardly to form a seat 164 for supporting the second mounting latch mechanism 158 which is secured to the seat by a suitable means such as nuts 151 and bolts 152, for example, or by welding or the like.

Upon installation of the airbag module 12 within the mounting recess 14, the biased, retractable latches 144,159 of the first and second mounting latch mechanisms 142,158 retract and allow passage of the module housing and, more specifically, the first and second endwalls 38,39 of the module housing. The latches are then biased outwardly again to engage a first opening comprising a first slot 166 defined by the first endwall 38 and a second opening comprising a second slot 168 defined by the second endwall 39. The engagement between the first biased latch 144 and the first slot 166, and the engagement between the second biased latch 159 and the second slot 168, in combination, secures the module housing 18 within the mounting recess 14.

Both of the biased, retractable latches 144,159 have a tip 145,161 that can slope inward and face upward towards the module housing to allow the latches to be more easily pushed in or retracted by the module housing 18 upon pressing the airbag module 12 into the mounting recess 14. The airbag module 12 is simply removed by pulling on the hooks 156 of the mounting latch mechanisms 142,158, through access holes 170 defined by the steering wheel cover 15, to retract the latches 144 and 159. Module biasing means biasing the module housing 18 away from the hub plate 16 comprises the molded base 36 of the airbag module cover 24 which is sandwiched between the curled lip 32 of the module housing 18 and the first and second mounting latch mechanisms 142,158.

Figure 10:
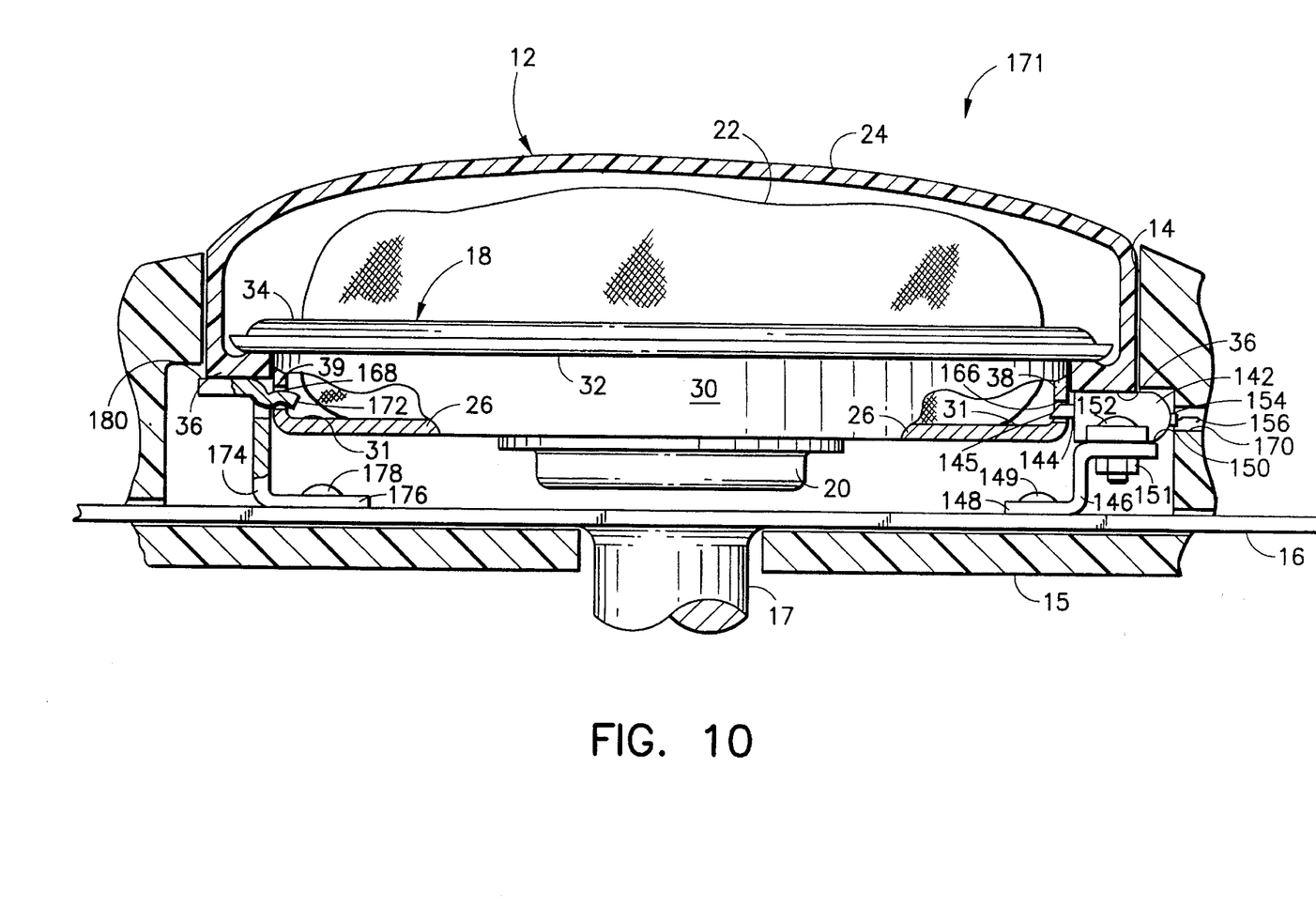
FIG. 10 is a plan view, partially in section, of another mounting system according to the present invention for an airbag module.

FIG. 10 shows an additional airbag module mounting system 171 according to the present invention that is similar to the mounting system 140 of FIG. 8. Elements of the mounting system 171 of FIG. 10 which are the same or perform the same or similar function as the additional elements of the mounting system 140 of FIG. 8 have the same reference numeral. In place of the second mounting latch mechanism 158, however, the mounting projection comprises a curved or bent mounting hook 172 for engaging the second slot 168 defined by the second endwall 39. The mounting hook 172 can be unitary with a second upright member 174 having a base 176 that is secured to the hub plate 16 by a suitable means such as a bolt 178, for example, or by welding or the like. The second upright member 174 bends outwardly to form a seat 180 for butting against the module biasing means comprising the molded base 36 of the airbag module cover 24. The airbag module 12 is mounted by first placing the second slot 168 over the mounting hook 172 and then pivoting the airbag module into the mounting recess 14 until the biased, retractable latch 144 of the first mounting latch mechanism 142 engages the first slot 166 defined by the first endwall 38.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. An airbag module mounting system comprising:

a module housing of an airbag module;

mounting structure within a mounting recess of a motor vehicle;

a first slot defined by one of the module housing or the mounting structure;

a first mounting latch mechanism secured to the other of the module housing or the mounting structure and having a biased, retractable latch extending outwardly therefrom engaging the first slot;

a second slot defined by one of the module housing or the mounting structure; and a mounting projection on the other of the module housing or the mounting structure engaging the second slot;

whereby the engagement between the biased latch and the first slot and the engagement between the mounting projection and the second slot, in combination, secure the module housing within the mounting recess.

2. The airbag module mounting system of claim 1 wherein:

the first slot is defined by the mounting structure; and the mounting latch mechanism is secured to the module housing of the airbag module.

3. The airbag module mounting system of claim 2 wherein:

the second slot is defined by the mounting structure; and the mounting projection is secured to the module housing.

4. The airbag module mounting system of claim 3 wherein the mounting projection comprises a second mounting latch mechanism having a biased latch extending outwardly therefrom engaging the second slot.

5. The airbag module mounting system of claim 4 wherein:

the first slot is defined by a first upright member of the mounting structure and the first mounting latch mechanism is secured to a bottom surface of a base plate of the module housing so that the biased latch of the first mounting latch mechanism extends transversely to the first upright member; and the second slot is defined by a second upright member of the mounting structure and the second mounting latch mechanism is secured to the bottom surface of the base plate of the module housing so that the biased latch of the second mounting latch mechanism extends transversely to the second upright member.

6. The airbag module mounting system of claim 4 wherein:

the first slot is defined by a hub sidewall of the mounting structure and the first mounting latch mechanism is secured to a bottom surface of a base plate of the module housing so that the biased latch of the first mounting latch mechanism extends transversely to the hub sidewall; and the second slot is defined by the hub sidewall of the mounting structure generally opposite the first slot and the second mounting latch mechanism is secured to the bottom surface of the base plate of the module housing so that the biased latch of the second mounting latch mechanism extends transversely to the hub sidewall.

7. The airbag module mounting system of claim 3 wherein the mounting projection comprises a mounting hook.

8. The airbag module mounting system of claim 7 wherein:

the first slot is defined by a first upright member of the mounting structure and the first mounting latch mechanism is secured to a bottom surface of a baseplate of the module housing so that the biased latch of the first mounting latch mechanism extends transversely to the first upright member; and the second slot is defined by a second upright member of the mounting structure and the mounting hook is secured to the bottom surface of the baseplate so that the mounting hook extends transversely to the second upright member.

9. The airbag module mounting system of claim 7 wherein:

the first slot is defined by a hub sidewall of the mounting structure and the first mounting latch mechanism is secured to a bottom surface of a baseplate of the module housing so that the biased latch of the first mounting latch mechanism extends transversely to the hub sidewall; and the second slot is defined by the hub sidewall of the mounting structure generally opposite the first slot and the mounting hook is secured to the bottom surface of the baseplate so that the mounting hook extends transversely to the hub sidewall.

10. The airbag module mounting system of claim 1 wherein:

the first slot is defined by the module housing; and the first mounting latch mechanism is secured to the mounting structure.

11. The airbag module mounting system of claim 10 wherein:

the second slot is defined by the module housing; and the mounting projection is secured to the mounting structure.

12. The airbag module mounting system of claim 11 wherein the mounting projection comprises a second mounting latch mechanism having a biased, retractable latch engaging the second slot.

13. The airbag module mounting system of claim 12 wherein:

the first slot is defined by a first vertical plate of the module housing and the first mounting latch mechanism is secured to the mounting structure so that the biased latch of the first mounting latch mechanism extends transversely to the first vertical plate; and the second slot is defined by a second vertical plate of the module housing and the second mounting latch mechanism is secured to the mounting structure so that the biased latch of the second mounting latch mechanism extends transversely to the second vertical plate.

14. The airbag module mounting system of claim 12 wherein:

the first slot is defined by a first endwall of the module housing and the first mounting latch mechanism is secured to the mounting structure so that the biased latch of the first mounting latch mechanism extends transversely to the first endwall; and the second slot is defined by a second endwall of the module housing and the second mounting latch mechanism is secured to the mounting structure so that the biased latch of the second mounting latch mechanism extends transversely to the second endwall.

15. The airbag module mounting system of claim 11 wherein the mounting projection comprises a mounting hook.

16. The airbag module mounting system of claim 15 wherein:

the first slot is defined by a first vertical plate of the module housing and the first mounting latch mechanism is secured to the mounting structure so that the biased latch of the first mounting latch mechanism extends transversely to the first vertical plate; and the second slot is defined by a second vertical plate of the module housing and the mounting hook is secured to the mounting structure so that the mounting hook extends transversely to the second vertical plate.

17. The airbag module mounting system of claim 15 wherein:

the first slot is defined by a first endwall of the module housing and the first mounting latch mechanism is secured to the mounting structure so that the biased latch of the first mounting latch mechanism extends transversely to the first endwall; and the second slot is defined by a second endwall of the module housing and the mounting hook is secured to the mounting structure so that the mounting hook extends transversely to the second endwall.

18. An airbag module for mounting to mounting structure within a mounting recess of a motor vehicle, the airbag module comprising:

an airbag cushion;

airbag cushion inflating means;

a module housing supporting the airbag cushion and airbag cushion inflating means;

one of a first slot defined by the module housing for receiving a retractable latch of a first mounting latch mechanism secured to the mounting structure, or a first mounting latch mechanism secured to the module housing and having a biased, retractable latch extending outwardly therefrom for retractably sliding along the mounting structure and then biasing outwardly again to engage a first slot defined by the mounting structure; and one of a second slot defined by the module housing for receiving a mounting projection on the mounting structure, or a mounting projection secured to the module housing for engaging a second slot defined by the mounting structure;

whereby an engagement between the biased latch and the first slot and an engagement between the mounting projection and the second slot, in combination, will secure the module housing of the airbag module within the mounting recess.

19. The airbag module of claim 18 wherein:

the first slot is defined by the module housing; and the second slot is defined by the module housing.

20. The airbag module of claim 19 wherein:

the first slot is defined by a first vertical plate of the module housing; and the second slot is defined by a second vertical plate of the module housing.

21. The airbag module of claim 19 wherein:

the first slot is defined by a first endwall of the module housing; and the second slot is defined by a second endwall of the module housing.

22. The airbag module of claim 18 wherein:

the first mounting latch mechanism is secured to the module housing; and the mounting projection is secured to the module housing.

23. The airbag module of claim 22 wherein the mounting latch mechanism comprises:

a case defining a cavity and a port communicating with the cavity;

a guide larger than the port and is slidingly received within the cavity of the case, the biased latch extending from the guide and slidingly extending through the port; and biasing means contained within the cavity biasing the guide towards the port.

24. The airbag module of claim 22 wherein the mounting projection comprises a second mounting latch mechanism having a biased latch for retractably sliding along the mounting structure and then biasing outwardly again to engage the second slot.

25. The airbag module mounting system of claim 22 wherein the mounting projection comprises a mounting hook.

* * * * *

UNITED STATES PATENT AND TRADEMARK OFFICE
CERTIFICATE OF CORRECTION

PATENT NO. : 5,620,201
DATED : April 15, 1997
INVENTOR(S) : Merle K. Ricks

It is certified that error appears in the above-indentified patent and that said Letters Patent is hereby corrected as shown below:

Col. 4, Ln. 21, correct "cushion" to read -- cushion 22. -- .

Signed and Sealed this

Fourth Day of November, 1997

Attest:

BRUCE LEHMAN

Attesting Officer     Commissioner of Patents and Trademarks